United States Patent
Olsson (10) Patent No.: US 10,843,687 B2
(45) Date of Patent: Nov. 24, 2020

(54) ARRANGEMENT AND METHOD FOR MITIGATING A FORWARD COLLISION BETWEEN ROAD VEHICLES

(71) Applicant: VOLVO CAR CORPORATION, Gothenburg (SE)

(72) Inventor: Claes Olsson, Molnlycke (SE)

(73) Assignee: VOLVO CAR CORPORATION, Gothenburg (SE)

( * ) Notice: Subject to any disclaimer, the term of this patent is extended or adjusted under 35 U.S.C. 154(b) by 315 days.

(21) Appl. No.: 15/871,510

(22) Filed: Jan. 15, 2018

(65) Prior Publication Data

US 2018/0208192 A1 Jul. 26, 2018

(30) Foreign Application Priority Data

Jan. 26, 2017 (EP) ..................................... 17153330

(51) Int. Cl.
*B60W 30/09* (2012.01)
*B60W 50/00* (2006.01)
(Continued)

(52) U.S. Cl.
CPC ......... *B60W 30/09* (2013.01); *B60T 8/17558* (2013.01); *B60W 10/18* (2013.01);
(Continued)

(58) Field of Classification Search
CPC .... B60W 30/085; B60W 30/08; B60W 30/09; B60W 30/095; B60W 30/0953;
(Continued)

(56) References Cited

U.S. PATENT DOCUMENTS 6,393,362 B1 * 5/2002 Burns .................. G05D 1/0278
340/940
7,893,819 B2 2/2011 Pfeiffer et al.
(Continued)

FOREIGN PATENT DOCUMENTS

CN 101132965 A 2/2008
CN 104118431 A 10/2014
(Continued)

OTHER PUBLICATIONS

Griffin, 70 mph speed limit now official on Utah's urban interstates, Dec. 9, 2014, The Salt Lake Tribute, https://archive.sltrib.com/article.php?id=1922845&itype=CMSID (Year: 2014).*
(Continued)

*Primary Examiner* — Thomas G Black
*Assistant Examiner* — Sara J Lewandroski
(74) *Attorney, Agent, or Firm* — Brooks Kushman P.C.

(57) ABSTRACT

Disclosed is an arrangement and a method for mitigating a forward collision between a host vehicle, having sensors for monitoring a road ahead and wheel brakes, and an oncoming vehicle. The sensors are utilized to estimate parameters of an oncoming vehicle. The estimated parameters are utilized to predict a future path of the oncoming vehicle, and host vehicle parameters are utilized to predict a future path of the host vehicle. The predicted future paths are assessed to determine if a forward collision is likely unavoidable assuming full freedom for performing avoidance maneuvers for both vehicles. The wheel brakes are controlled to reduce a relative longitudinal velocity between the vehicles at a predicted collision instant if determined that a forward collision is likely unavoidable at a determined relative longitudinal velocity above a first threshold.

12 Claims, 7 Drawing Sheets

(51) Int. Cl.
  *B60W 30/095* (2012.01)
  *B60W 10/18* (2012.01)
  *G08G 1/16* (2006.01)
  *B60T 8/1755* (2006.01)

(52) U.S. Cl.
  CPC ...... *B60W 30/095* (2013.01); *B60W 30/0953* (2013.01); *B60W 30/0956* (2013.01); *B60W 50/0097* (2013.01); *G08G 1/166* (2013.01); *G08G 1/167* (2013.01); *B60T 2201/024* (2013.01); *B60W 2554/80* (2020.02); *B60W 2754/10* (2020.02)

(58) Field of Classification Search
  CPC .. B60W 30/0956; B60T 8/17558; G08G 1/16; G08G 1/161; G08G 1/162; G08G 1/163; G08G 1/164; G08G 1/165; G08G 1/166; G08G 1/167
  See application file for complete search history.

(56) References Cited

U.S. PATENT DOCUMENTS

| | | | |
|---|---|---|---|
| 9,056,615 B2* | 6/2015 | Harda | B60R 21/0134 |
| 9,545,911 B2 | 1/2017 | Kim | |
| 9,701,307 B1* | 7/2017 | Newman | B60W 10/184 |
| 9,761,142 B2* | 9/2017 | Pflug | B62D 6/00 |
| 10,222,228 B1* | 3/2019 | Chan | G01C 21/3691 |
| 10,421,398 B2* | 9/2019 | Igarashi | G08G 1/167 |
| 2004/0117116 A1* | 6/2004 | Rao | B60R 21/0132 |
| | | | 701/301 |
| 2007/0228704 A1* | 10/2007 | Cuddihy | B60R 21/0132 |
| | | | 280/735 |
| 2011/0077864 A1* | 3/2011 | Konijnendijk | B60T 8/17558 |
| | | | 701/301 |
| 2012/0130629 A1* | 5/2012 | Kim | B60W 30/09 |
| | | | 701/301 |
| 2014/0039786 A1* | 2/2014 | Schleicher | B60W 30/09 |
| | | | 701/301 |
| 2014/0324287 A1* | 10/2014 | Tsuchida | B60W 30/095 |
| | | | 701/36 |
| 2014/0350790 A1* | 11/2014 | Akesson | G08G 1/167 |
| | | | 701/41 |
| 2015/0329046 A1* | 11/2015 | Igarashi | G08G 1/165 |
| | | | 340/435 |
| 2015/0353133 A1 | 12/2015 | Mukai | |
| 2016/0052515 A1* | 2/2016 | Choi | B60W 30/0956 |
| | | | 701/1 |
| 2016/0207534 A1 | 7/2016 | Nishimura et al. | |
| 2016/0368490 A1 | 12/2016 | Erban et al. | |
| 2017/0349171 A1* | 12/2017 | Jordan | B60W 10/30 |
| 2018/0065623 A1* | 3/2018 | Wodrich | B60W 30/06 |
| 2018/0118201 A1* | 5/2018 | Matsunaga | B60W 50/14 |
| 2018/0118205 A1* | 5/2018 | Minemura | B60W 10/18 |
| 2019/0047555 A1* | 2/2019 | During | B62D 15/0265 |
| 2019/0084561 A1* | 3/2019 | Takeda | B60W 30/14 |
| 2019/0111920 A1* | 4/2019 | Oesterle | B60W 30/09 |

FOREIGN PATENT DOCUMENTS

| | | |
|---|---|---|
| CN | 105292114 A | 2/2016 |
| CN | 105799700 A | 7/2016 |
| CN | 106256622 | 12/2016 |
| DE | 102015211276 A1 | 12/2016 |
| EP | 2302412 A1 | 3/2011 |
| WO | 2006092431 A1 | 9/2006 |

OTHER PUBLICATIONS

Extended European Search Report dated Jul. 10, 2017, Application No. 17153330.0-1762—Applicant Volvo Car Corporation, 7 Pages.
European Third Party Observation Dated Dec. 9, 2019, Application No. 17153330.0, Applicant Volvo Car Corporation, 59 Pages.
European Office Action dated Feb. 27, 2020, Application No. 17153330.0, 4 Pages.
Italian Application Document MI 2008 A 1384, Date of Application Jul. 28, 2008, "Sistema E Metodo Di Controllo E Assistenza Alla Guida Di Un Veicolo A Motore" (with attached English Translation—"System and method of control and assistance to the driving of a motor vehicle") 36 Pages.
Chinese Office Action in Appl. No. CN201810047772.9 dated Aug. 21, 2020 with machine translation.

* cited by examiner

ARRANGEMENT AND METHOD FOR MITIGATING A FORWARD COLLISION BETWEEN ROAD VEHICLES

CROSS-REFERENCE TO RELATED APPLICATIONS

This application claims foreign priority benefits under 35 U.S.C. § 119(a)-(d) to European patent application number EP 17153330.0, filed Jan. 26, 2017, which is incorporated by reference in its entirety.

TECHNICAL FIELD

The present disclosure relates to an arrangement for mitigating a forward collision between a host vehicle and an oncoming vehicle.

The disclosure further relates to a method for mitigating a forward collision between a host vehicle and an oncoming vehicle.

Still further, the disclosure refers to a road vehicle comprising such an arrangement for mitigating a forward collision between a host vehicle and an oncoming vehicle.

BACKGROUND

A current trend in the automotive industry is to introduce active safety systems for avoiding or mitigating collisions. Some of the introduced active safety systems, such as e.g., Forward Collision Avoidance Systems (FCAS), are aimed at avoiding or mitigating forward collisions between a vehicle hosting such a system and an oncoming vehicle. These active safety systems have a potentially large positive impact on accident statistics. Forward collisions between two vehicles may, for example, be due to intentional or unintentional lane changes or to the fact that any of the drivers of the vehicles does not drive completely on the correct side of a road.

In known active safety systems for avoiding or mitigating a forward collision between a host vehicle and an oncoming vehicle, a vehicle forward collision threat evaluation system performs an evaluation of the vehicle forward collision threat before any action in order to avoid or mitigate a collision is executed. Normally, the vehicle forward collision threat evaluation systems utilize one or more sensors based on technologies such as RADAR (RAdio Detection And Ranging), LIDAR (LIght Detection And Ranging), LASER (Light Amplification by Stimulated Emission of Radiation) and cameras in order to establish the presence of an oncoming vehicle and estimate parameters such as the distance between the oncoming vehicle and the host vehicle, lateral and longitudinal velocity of the oncoming vehicle, and lateral and longitudinal acceleration of the oncoming vehicle.

Typically, the estimated parameters are utilized for prediction of a future path of the oncoming vehicle. The predicted future path of the oncoming vehicle is then compared with a predicted future path of the host vehicle in order to check if a collision between the host vehicle and the oncoming vehicle is likely to occur, i.e., in order to decide whether there is a vehicle forward collision threat or not. In case it is decided that a vehicle forward collision threat exists, a collision avoidance functionality may be executed by the active safety system. For example, a Forward Collision Warning (FCW) functionality, a Collision Mitigation by Braking (CMbB) or an autonomous steering intervention of the host vehicle may then be executed.

Forward Collision Warning (FCW) is a function that warns the driver in case a collision with a target object seems likely. Collision Mitigation by Braking (CMbB) is a function that automatically applies braking in case a collision with a target object is unavoidable.

In order for an action executed in order to avoid a collision, e.g., an FCW, CMbB or autonomous steering intervention, to be effective, it has to be initiated before an estimated collision time point (or passing time point). Thus, vehicle forward collision threat evaluation will usually be performed a few seconds before an estimated collision time point, i.e., the future path of the oncoming vehicle, which is utilized for comparison with the path of the host vehicle in the evaluation, will be predicted a few seconds before an estimated collision time point. However, the longer in advance this prediction is made the more time will be available for unexpected maneuvers of the oncoming vehicle, i.e., the longer the timespan the more things can happen during the time between the time point of prediction of the future path of the oncoming vehicle and the time point when the vehicles reach each other. This may result in another actual path of the oncoming vehicle than what could reasonably have been expected at the time of performing the prediction.

Thus, since there is an element of uncertainty when it comes to future movements of the oncoming vehicle, in accordance with the above, vehicle forward collision threat evaluation based on a comparison of a predicted future path of an oncoming vehicle and a predicted future path of a host vehicle may, is some instances, result in alarms and interventions which due to unexpected collision avoidance maneuvers by the oncoming vehicle turns out to have been superfluous.

Consequently, there is still a need for improved arrangements for mitigating forward collisions between host vehicles and oncoming vehicles which are useful if a subsequent collision really occurs whilst being less prone to alarms and interventions should a collision be avoidable.

SUMMARY

Embodiments herein aim to provide an improved arrangement for mitigating a forward collision between a host vehicle and an oncoming vehicle, the host vehicle having one or more sensors arranged to monitor a road ahead of the host vehicle and a braking system connected to wheel brakes thereof.

This is provided through an arrangement that comprises: a vehicle forward collision threat evaluation system arranged to: utilize the one or more sensors to establish the presence of an oncoming vehicle and estimate parameters such as the distance between the oncoming vehicle and the host vehicle, lateral and longitudinal velocity of the oncoming vehicle, relative longitudinal velocity between the host vehicle and the oncoming road vehicle and lateral and longitudinal acceleration of the oncoming vehicle; utilize the estimated parameters to predict a future path of the oncoming vehicle; utilize host vehicle parameters to predict a future path of the host vehicle; assessing the predicted future paths of the oncoming vehicle and of the host vehicle to determine if a forward collision between the host vehicle and the oncoming vehicle is likely unavoidable assuming full freedom for performing avoidance maneuvers for both the host vehicle and the oncoming vehicle in the prediction of the respective future paths of the host vehicle and the oncoming vehicle, and a forward collision mitigation brake controller arranged to control the braking system to control the wheel brakes of the host vehicle to reduce a relative longitudinal velocity between the host vehicle and the oncoming vehicle at a predicted collision instant if determined that a forward collision between the host vehicle and the oncoming vehicle is likely unavoidable at a determined relative longitudinal velocity above a first threshold.

According to a second aspect is provided that the forward collision mitigation brake controller is arranged to control the wheel brakes of the host vehicle to reduce a relative velocity between the host vehicle and the oncoming vehicle through activating at least one of: brake gain to increase braking if a driver of the road vehicle is already braking; and auto brake to perform braking if a driver of the road vehicle is not already braking.

The provision of having the forward collision mitigation brake controller arranged to control the wheel brakes of the host vehicle to reduce a relative velocity between the host vehicle and the oncoming vehicle through activating brake gain is an efficient way to increase braking if a driver of the road vehicle is already braking since the driver braking can be seen as a confirmation of a critical situation where an early intervention may be motivated, and activating auto brake correspondingly is useful in critical situations where a driver of the road vehicle is not already braking.

According to a third aspect is provided that the vehicle forward collision threat evaluation system is arranged to compare the predicted future path of the oncoming vehicle with the predicted future path of the host vehicle to determine if a forward collision between the host vehicle and the oncoming vehicle is likely unavoidable assuming full freedom for performing avoidance maneuvers for both the host vehicle and the oncoming vehicle and using an assessment of the host vehicle's and target vehicle's possibilities to avoid the accident, such that a forward collision is determined as likely unavoidable if both the host vehicle and the oncoming vehicle needs to perform evasive manoeuvres close to the dynamic capabilities of the respective vehicles to avoid a forward collision.

The provision of assuming full freedom for performing avoidance manoeuvres for both the host vehicle and the oncoming vehicle and using an assessment of the host vehicle's and target vehicle's possibilities to avoid the accident, such that a forward collision is determined as likely unavoidable if both the host vehicle and the oncoming vehicle needs to perform evasive maneuvers close to the dynamic capabilities of the respective vehicles to avoid a forward collision makes it possible to intervene at a very late stage and as a result interventions at an earlier stage, where a collision potentially still could be avoidable, can be eliminated or at least significantly reduced.

According to a fourth aspect is provided that the vehicle forward collision threat evaluation system is arranged to compare the predicted future path of the oncoming vehicle with the predicted future path of the host vehicle to determine if a forward collision between the host vehicle and the oncoming vehicle is likely unavoidable assuming full freedom for performing avoidance maneuvers for both the host vehicle and the oncoming vehicle and using an assessment of best case scenarios for the host vehicle's and target vehicle's possibilities to avoid the accident, such that a forward collision is determined as likely unavoidable if the considered best case scenarios for both the host vehicle and the oncoming vehicle are predicted to end in a forward collision.

The provision of using an assessment of best case scenarios, as above, further enhances the determination that a forward collision between the host vehicle and the oncoming vehicle truly is unavoidable and thus contributes to further eliminating or significantly reducing interventions at an earlier stage, where a collision potentially still could be avoidable.

According to a fifth aspect is provided that the vehicle forward collision threat evaluation system is arranged to: predict relative lateral vehicle positions of the host vehicle and the oncoming vehicle at a predicted collision instant; predict relative lateral motion of the host vehicle and the oncoming vehicle at a predicted collision instant; assume lateral avoidance maneuvers of the host vehicle and the oncoming vehicle; assume longitudinal motion of the host vehicle and the oncoming vehicle, and determine if a forward collision between the host vehicle and the oncoming vehicle is likely unavoidable through assessing at least one of: predicted relative lateral vehicle positions of the host vehicle and the oncoming vehicle at a predicted collision instant; predicted relative lateral motion of the host vehicle and the oncoming vehicle at a predicted collision instant; assumed lateral avoidance maneuvers of the host vehicle and the oncoming vehicle; assumed longitudinal motion of the host vehicle and the oncoming vehicle.

The provision of the vehicle forward collision threat evaluation system being arranged to determine if a forward collision between the host vehicle and the oncoming vehicle is likely unavoidable based on an assessment of the above predictions and assumptions still further enhances the determination that a forward collision between the host vehicle and the oncoming vehicle truly is unavoidable and thus contributes to further eliminating or significantly reducing interventions at an earlier stage, where a collision potentially still could be avoidable.

According to a sixth aspect is provided that the vehicle forward collision threat evaluation system is arranged to adjust at least one of the predictions and assumptions based on at least one of: data on a determined state of a driver of the host vehicle; data on a configuration of host vehicle surrounding infrastructure; data on a host vehicle traffic situation.

The provision of the vehicle forward collision threat evaluation system being arranged to adjust at least one of the predictions and assumptions based on at least one of the above yet even further enhances the determination that a forward collision between the host vehicle and the oncoming vehicle truly is unavoidable and thus contributes to further eliminating or significantly reducing interventions at an earlier stage, where a collision potentially still could be avoidable and enabling the performance of a reduction of the relative longitudinal velocity between the host vehicle and the oncoming vehicle as early as possible and thus a longer duration of brake activation leading to an increased reduction of the relative longitudinal velocity and hence improved safety.

According to a seventh aspect is provided that the arrangement further comprises a warning arrangement, arranged to alert at least one of a driver of the host vehicle and a driver of the oncoming vehicle if determined that a forward collision between the host vehicle and the oncoming vehicle is likely unavoidable.

The provision of a warning arrangement, arranged to alert at least one of a driver of the host vehicle and a driver of the oncoming vehicle, as above, provides an efficient way of alerting the vehicle drivers of the impending danger.

According to an eight aspect is provided that the arrangement further comprises a supplemental restraint system, arranged to activate at least one of seat belt pre-tensioners, front airbags and inflatable curtains if determined that a forward collision between the host vehicle and the oncoming vehicle is likely unavoidable.

The provision of a supplemental restraint system arranged as above provides for improved safety for any vehicle occupants involved in a forward collision between a host vehicle and an oncoming vehicle.

According to a ninth aspect is provided that the forward collision mitigation brake controller is arranged to control the wheel brakes of the host vehicle to reduce a relative velocity between the host vehicle and the oncoming vehicle at a predicted collision time if determined that a forward collision between the host vehicle and the oncoming vehicle is likely unavoidable at a determined relative longitudinal velocity above a first threshold of 100 km/h.

The provision of the above first threshold of 100 km/h ensures that interventions are limited to velocities where the highest mitigation benefits are available and avoid interference with passive safety systems of the vehicles, which today usually are quite capable of handling collisions below the first threshold relative velocity.

According to a tenth aspect is provided an improved method for mitigating a forward collision between a host vehicle and an oncoming vehicle, the host vehicle having one or more sensors arranged to monitor a road ahead of the host vehicle and a braking system connected to wheel brakes thereof.

This is provided through a method that comprises the steps of: utilizing the one or more sensors to establish the presence of an oncoming vehicle and estimating parameters such as the distance between the oncoming vehicle and the host vehicle, lateral and longitudinal velocity of the oncoming vehicle, relative longitudinal velocity between the host vehicle and the oncoming road vehicle and lateral and longitudinal acceleration of the oncoming vehicle; utilizing the estimated parameters to predict a future path of the oncoming vehicle; utilizing host vehicle parameters to predict a future path of the host vehicle; assessing the predicted future paths of the oncoming vehicle and of the host vehicle to determine if a forward collision between the host vehicle and the oncoming vehicle is likely unavoidable assuming full freedom for performing avoidance maneuvers for both the host vehicle and the oncoming vehicle in the prediction of the respective future paths of the host vehicle and the oncoming vehicle; determining if a relative longitudinal velocity is above a first threshold; and controlling the wheel brakes of the host vehicle to reduce a relative longitudinal velocity between the host vehicle and the oncoming vehicle at a predicted collision instant if determined that a forward collision between the host vehicle and the oncoming vehicle is likely unavoidable at a determined relative longitudinal velocity above a first threshold.

According to an eleventh aspect is provided a road vehicle that comprises an arrangement for mitigating a forward collision between a host vehicle and an oncoming vehicle, as above.

The provision of a road vehicle that comprises an arrangement for mitigating a forward collision between a host vehicle and an oncoming vehicle, as above, provides for efficient mitigation through providing a reduction of a relative longitudinal velocity between the host vehicle and the oncoming vehicle at a predicted collision instant, such that passive safety systems of the vehicle may better handle a resulting collision.

BRIEF DESCRIPTION OF THE DRAWINGS

In the following, embodiments herein will be described in greater detail by way of example only with reference to the attached drawings.

Still other objects and features of embodiments herein will become apparent from the following detailed description considered in conjunction with the accompanying drawings. It is to be understood, however, that the drawings are designed solely for purposes of illustration and not as a definition of the limits hereof, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION

Embodiments herein are based on the realization that the severity of head-on or forward collisions between road vehicles 2 can be reduced significantly if the relative longitudinal velocity between a host vehicle 2a and an oncoming vehicle 2b can be reduced at a predicted collision instant, especially if this relative longitudinal velocity is reduced from a higher relative velocity, where passive safety systems of the vehicle have a limited ability to handle a collision, towards a reduced relative velocity where such passive safety systems of the vehicles 2 are better equipped for handling a subsequent collision.

Figure 1:
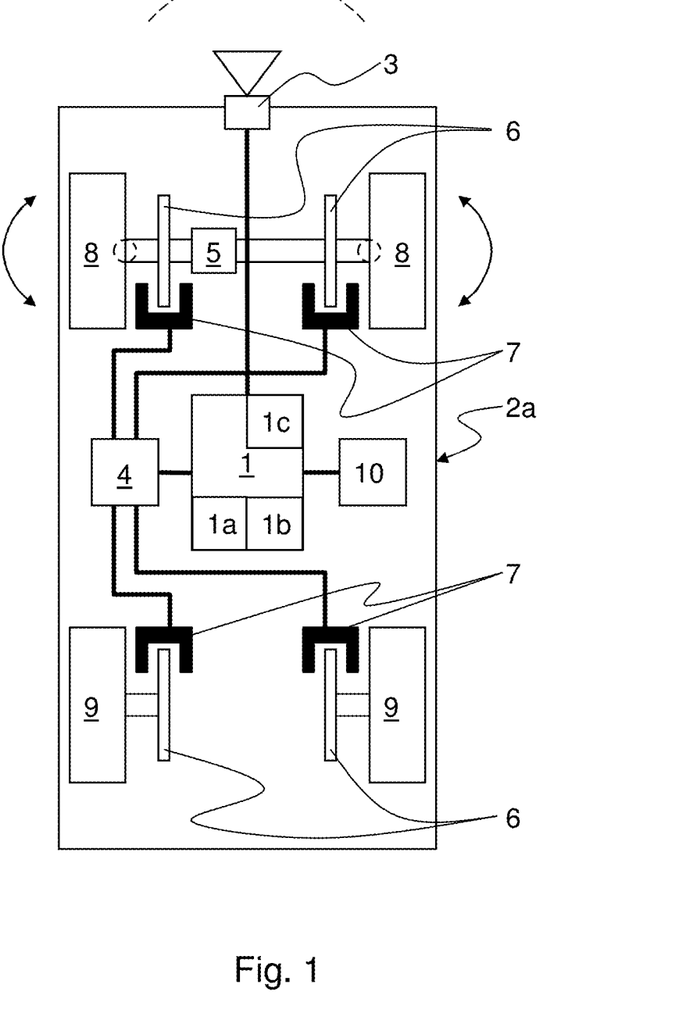
FIG. 1 is a schematic illustration of an arrangement for mitigating a forward collision between a host vehicle and an oncoming vehicle according to embodiments herein.

Thus, embodiments herein aim to provide an improved arrangement 1 for mitigating a forward collision between a host vehicle 2a and an oncoming vehicle 2b, as illustrated schematically in FIG. 1. The collision mitigating arrangement 1 is arranged in a host vehicle 2a, i.e., a vehicle hosting the collision mitigating arrangement 1. The host vehicle 2a has one or more sensors 3 arranged to monitor a road ahead of the host vehicle 2a and a braking system 4 connected to wheel brakes 6, 7 thereof. The braking system 4 may e.g., be an Antilock Brake System (ABS system), e.g., with brake discs 6 and appertaining calipers 7 associated with each of the front wheels 8 and rear wheels 9 of the host vehicle 2a. The host vehicle 2a further usually has a power steering system 5, which is arranged to control the steering angle of the front wheels 8.

The collision mitigating arrangement 1 comprises: a vehicle forward collision threat evaluation system 1a arranged to: utilize the one or more sensors 3, based on technologies such as RADAR (RAdio Detection And Ranging), LIDAR (LIght Detection And Ranging), LASER (Light Amplification by Stimulated Emission of Radiation) and cameras, to establish the presence of an oncoming vehicle 2b and estimate parameters, such as the distance between the oncoming vehicle 2b and the host vehicle 2a, lateral and longitudinal velocity of the oncoming vehicle 2b, relative longitudinal velocity between the host vehicle 2a and the oncoming vehicle 2b and lateral and longitudinal acceleration of the oncoming vehicle 2b.

The vehicle forward collision threat evaluation system 1a is further arranged to: utilize the estimated parameters to predict a future path of the oncoming vehicle 2b; utilize host vehicle 2a parameters to predict a future path of the host vehicle 2a; assessing the predicted future paths of the oncoming vehicle 2b and of the host vehicle 2a to determine if a forward collision between the host vehicle 2a and the oncoming vehicle 2b is likely unavoidable. The determination if a collision is likely unavoidable may be tuned as appropriate to include both truly unavoidable collisions as well as close to unavoidable collisions as being likely unavoidable.

Host vehicle 2a parameters may e.g., include lateral and longitudinal velocity as well as and lateral and longitudinal acceleration of the host vehicle 2a.

The vehicle forward collision threat evaluation system 1a is arranged to determine if a forward collision between the host vehicle 2a and the oncoming vehicle 2b is likely unavoidable assuming full freedom for performing avoidance maneuvers, such as automatic or driver-performed steering interventions, for both the host vehicle 2a and the oncoming vehicle 2b (e.g., evasive steering maneuvers of the vehicles 2a and 2b in opposite directions) in the prediction of the respective future paths of the host vehicle 2a and the oncoming vehicle 2b. Full freedom for performing avoidance maneuvers may mean that both vehicles will be able to use the full or maximum capability or capabilities (e.g., steering capability or combination of braking and steering capabilities) of the respective vehicle, taking the other vehicle's actions into account, to avoid a frontal collision. In contrast, a vehicle driver may not be able to use full capability or capabilities of the respective vehicle because of lack of sufficient time for performing an avoidance maneuver due lack of threat awareness, for example.

The collision mitigating arrangement 1 further comprises a forward collision mitigation brake controller 1b arranged to control the braking system 4 to control the wheel brakes 6,7 of the host vehicle 2a to reduce a relative longitudinal velocity between the host vehicle 2a and the oncoming vehicle 2b at a predicted collision instant if determined that a forward collision between the host vehicle 2a and the oncoming vehicle 2b is likely unavoidable at a determined relative longitudinal velocity above a first threshold. The first threshold is suitably selected such that passive safety systems of current road vehicles 2 are well equipped to handle a forward collision at relative lateral velocities below the first threshold.

In embodiments hereof, the forward collision mitigation brake controller 1b is arranged to control the wheel brakes 6, 7 of the host vehicle 2a to reduce a relative velocity between the host vehicle 2a and the oncoming vehicle 2b through activating at least one of: brake gain to increase braking if a driver of the host vehicle 2a is already braking; and auto brake to perform braking if a driver of the host vehicle 2a is not already braking.

Controlling the wheel brakes 6, 7 of the host vehicle 2a to reduce a relative velocity between the host vehicle 2a and the oncoming vehicle 2b through activating brake gain is an efficient way to increase braking if a driver of the host vehicle 2a is already braking since the driver braking can be seen as a confirmation of a critical situation where an early intervention may be motivated. Activating auto brake, correspondingly, is useful in critical situations where a driver of the host vehicle 2a is not already braking.

In further embodiments herein the vehicle forward collision threat evaluation system 1a is arranged to compare the predicted future path of the oncoming vehicle 2b with the predicted future path of the host vehicle 2a to determine if a forward collision between the host vehicle 2a and the oncoming vehicle 2b is likely unavoidable. This comparison is done assuming full freedom for performing avoidance maneuvers for both the host vehicle 2 and the oncoming vehicle 2b and using an assessment of the host vehicle's and target vehicle's possibilities to avoid the accident. This comparison is further done such that a forward collision is determined as likely unavoidable if both the host vehicle 2a and the oncoming vehicle 2b needs to perform evasive maneuvers close to the dynamic capabilities of the respective vehicles 2 to avoid a forward collision.

By assuming full freedom for performing avoidance maneuvers for both the host vehicle 2a and the oncoming vehicle 2b and using an assessment of the host vehicle's and target vehicle's possibilities to avoid the accident, such that a forward collision is determined as likely unavoidable if both the host vehicle 2a and the oncoming vehicle 2b need to perform evasive maneuvers close to the dynamic capabilities of the respective vehicles 2 to avoid a forward collision it is possible to intervene at a very late stage. As a result, it is possible to eliminate or at least significantly reduce interventions at an earlier stage, where a collision potentially still could be avoidable.

In yet further embodiments the vehicle forward collision threat evaluation system 1a is arranged to compare the predicted future path of the oncoming vehicle 2b with the predicted future path of the host vehicle 2a to determine if a forward collision between the host vehicle 2a and the oncoming vehicle 2b is likely unavoidable assuming full freedom for performing avoidance maneuvers for both the host vehicle and the oncoming vehicle 2b and using an assessment of best case scenarios for the host vehicle's and target vehicle's possibilities to avoid the accident. Hence a forward collision is determined as likely unavoidable if the considered best case scenarios for both the host vehicle 2a and the oncoming vehicle 2b are predicted to end in a forward collision.

Using an assessment of best case scenarios, as above, further enhances the determination that a forward collision between the host vehicle 2a and the oncoming vehicle 2b truly is unavoidable and thus contributes to further eliminating or significantly reducing interventions at an earlier stage, where a collision potentially still could be avoidable.

According to still further embodiments the vehicle forward collision threat evaluation system 1a is arranged to: predict relative lateral vehicle positions of the host vehicle 2a and the oncoming vehicle 2b at a predicted collision instant; predict relative lateral motion of the host vehicle 2a and the oncoming vehicle 2b at a predicted collision instant; assume lateral avoidance maneuvers of the host vehicle 2a and the oncoming vehicle 2b; assume longitudinal motion of the host vehicle 2a and the oncoming vehicle 2b.

The vehicle forward collision threat evaluation system 1a is further arranged to determine if a forward collision between the host vehicle 2a and the oncoming vehicle 2b is likely unavoidable through assessing at least one of: predicted relative lateral vehicle positions of the host vehicle 2a and the oncoming vehicle 2b at a predicted collision instant; predicted relative lateral motion of the host vehicle 2a and the oncoming vehicle 2b at a predicted collision instant; assumed lateral avoidance maneuvers of the host vehicle 2a and the oncoming vehicle 2b; assumed longitudinal motion of the host vehicle 2a and the oncoming vehicle 2b.

Determining if a forward collision between the host vehicle 2a and the oncoming vehicle 2b is likely unavoidable based on an assessment of the above predictions and assumptions still further enhances the determination that a forward collision between the host vehicle 2a and the oncoming vehicle 2b truly is unavoidable and thus contributes to further eliminating or significantly reducing interventions at an earlier stage, where a collision potentially still could be avoidable.

In some further embodiments, the vehicle forward collision threat evaluation system 1a is arranged to adjust at least one of the predictions and assumptions based on at least one of: data on a determined state of a driver of the host vehicle 2a; data on a configuration of host vehicle 2a surrounding infrastructure; data on a host vehicle 2a traffic situation.

The vehicle forward collision threat evaluation system 1a being arranged to adjust at least one of the predictions and assumptions based on at least one of the above, yet even further enhances the determination that a forward collision between the host vehicle 2a and the oncoming vehicle 2b truly is unavoidable, and thus contributes to further eliminating or significantly reducing interventions at an earlier stage, where a collision potentially still could be avoidable. It also enables the performance of a reduction of the relative longitudinal velocity between the host vehicle 2a and the oncoming vehicle 2b as early as possible and thus a longer duration of brake activation leading to an increased reduction of the relative longitudinal velocity and hence improved safety.

An example of such adjustment could e.g., be to assume a less evasive lateral avoidance maneuver if a driver of the host vehicle 2a is determined to be looking down into the passenger compartment and not on the road ahead, e.g., using a driver monitoring camera. In such cases, it is assumed that the driver will not perform a very late avoidance maneuver on the host vehicle's handling limits.

A further example of such adjustment is to exclude an avoidance maneuver assuming steering in a direction of the host vehicle 2a surroundings where there is no free space, e.g., due to blocking vehicles or blocking infrastructure elements, such as barriers.

According to yet further embodiments are provided that the collision mitigating arrangement 1 further comprises a warning arrangement 1c. Such a warning arrangement 1c is than arranged to alert at least one of a driver of the host vehicle 2a and a driver of the oncoming vehicle 2b, if determined that a forward collision between the host vehicle 2a and the oncoming vehicle 2b is likely unavoidable.

Such a warning arrangement 1c, arranged to alert at least one of a driver of the host vehicle 2a and a driver of the oncoming vehicle 2b, as above, provides an efficient way of alerting the vehicle drivers of the impending danger.

A warning to a driver of the host vehicle 2a could for example be provided as an optical warning, e.g., flashing warning sign, an acoustic warning, i.e., a sound, a haptic warning, e.g., through vibrating seat, steering wheel or pedals of the host vehicle 2a or as a combination of such warning modalities. The warning could be timed to be activated before the activation of the wheel brakes 6, 7, coinciding with activation of the wheel brakes 6, 7, or also at a later stage of the period leading up to the collision.

A warning to an oncoming vehicle 2b could be provided in a similar way using e.g., headlights or a signal horn of the host vehicle 2a.

In some still further embodiments are provided that the collision mitigating arrangement 1 further comprises a supplemental restraint system 10, also known as SRS-system, arranged to activate at least one of seat belt pretensioners, front airbags and inflatable curtains of the host vehicle 2a if determined that a forward collision between the host vehicle 2a and the oncoming vehicle 2b is likely unavoidable.

Having a supplemental restraint system 10 arranged as above provides for still further improved safety for any vehicle occupants involved in a forward collision between a host vehicle 2a and an oncoming vehicle 2b.

In yet some further embodiments the forward collision mitigation brake controller 1b is arranged to control the wheel brakes 6, 7 of the host vehicle 2a to reduce a relative velocity between the host vehicle 2a and the oncoming vehicle 2b at a predicted collision time if determined that a forward collision between the host vehicle 2a and the oncoming vehicle 2b is likely unavoidable at a determined relative longitudinal velocity above a first threshold of 100 km/h.

A first threshold of 100 km/h ensures that interventions are limited to velocities where the highest mitigation benefits are available and avoid interference with passive safety systems of the vehicles, which today usually are quite capable of handling collisions below the first threshold relative velocity of 100 km/h.

However, although a first threshold of 100 km/h is a suitable first threshold based on some current vehicles, it is proposed to adapt this first threshold to the passive safety systems available in a specific host vehicle 2a where use of the proposed arrangement is contemplated. It is also proposed to adapt this first threshold to any future developments in passive safety systems. Hence, it is envisaged that the first threshold in further embodiments could be any one of: 80 km/h; 90 km/h; 100 km/h; 110 km/h; 120 km/h; 130 km/h.

In the following, a non-limiting numerical example is given to illustrate a fundamental algorithm where none of the "adjustment principles" described above are taken into account.

Figure 2:
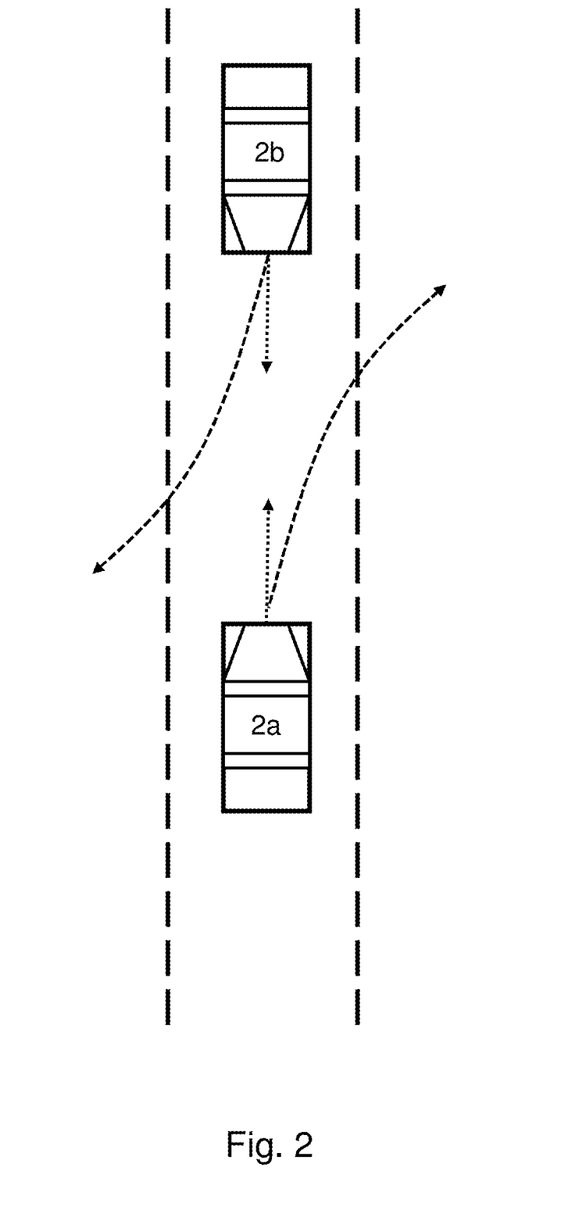
FIG. 2 is a schematic illustration of a head on scenario where a host vehicle and an oncoming vehicle are driving straight towards each other in opposite directions.

The example is based on the assumption of a head on scenario, as illustrated in FIG. 2, where the host vehicle 2a and the oncoming vehicle 2b are driving straight towards each other in opposite directions. The dotted arrows illustrate potential braking interventions and the dashed curved arrows illustrate potential steering interventions. The host vehicle 2a starts braking when both vehicles are required to steer away with a lateral acceleration of $a_y$ [m/s$^2$]. The host vehicle 2a brakes with a maximum longitudinal acceleration of $a_x$ [m/s$^2$] where the wheel brakes 6, 7 are activated to eliminate any brake system delay $T_d$ [s] and deceleration is built up with J [m/s$^3$].

Figure 3:
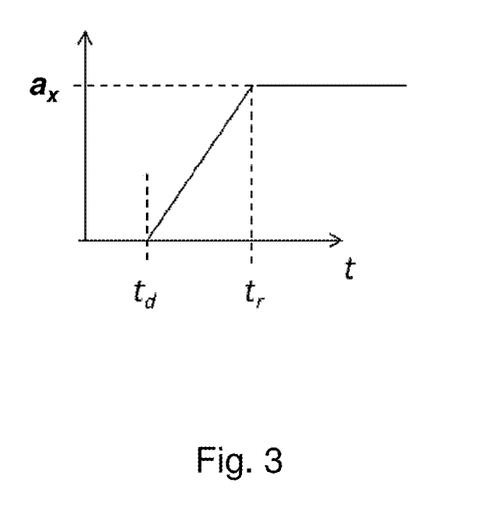
FIG. 3 is a schematic illustration of simple brake system characteristics for vehicle deceleration as a function of time.

A very simple brake system model is used, according to FIG. 3. For lateral motion only constant acceleration is assumed. Combined braking and steering is possible to assume but not exemplified here. As illustrated in FIG. 3 the longitudinal deceleration of a braking vehicle is zero for $T_d$ [s] after start of braking, whereupon it is ramped up to the maximum longitudinal deceleration $a_x$ [m/s$^2$] at a time $t_r$ (i.e. $a_x = J \times (t_r - t_d)$).

Thus, the lateral acceleration of the host vehicle 2a and the oncoming vehicle 2b are assumed to be $a_y = 5$ [m/s$^2$] for both vehicles, i.e., 10 [m/s$^2$] relative lateral acceleration. The maximum longitudinal acceleration is assumed to be $a_x = 10$

[m/s²]. A host vehicle 2a and oncoming vehicle 2b distance lateral overlap is assumed to be $p_y$=1.2 [m] and the longitudinal velocities of the vehicles are assumed to be 50; 60; 70; 80; 90 and 100 [km/h]. Deceleration is assumed to be built up with J=40 [m/s³]. It is further assumed that the brakes could be activated to eliminate any brake system delay, i.e., $T_d$=0.0 [s].

Figure 4:
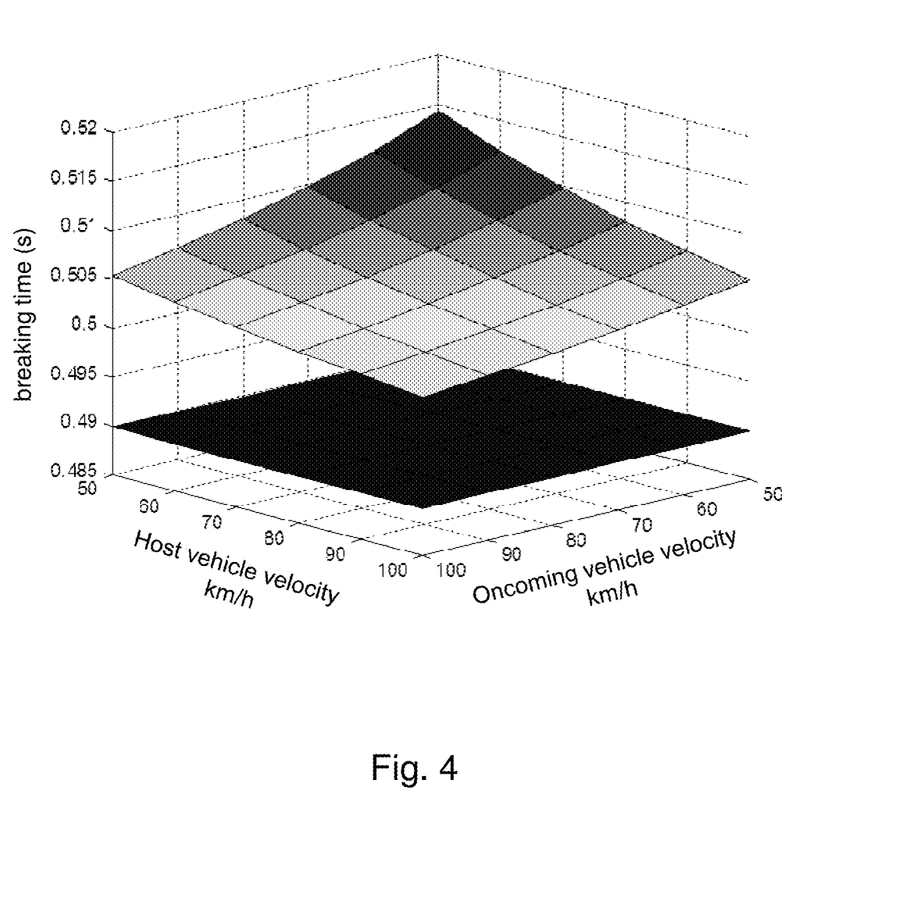
FIG. 4 is a schematic illustration of time to collision (TTC) at constant velocity when a braking maneuver starts (lower dark surface) and braking durations for different host and oncoming vehicle velocities (upper patched surface) according to an example herein.

In FIG. 4 the lower dark surface illustrates the time to collision (TTC) at constant velocity when a braking maneuver starts and the upper patched surface illustrates braking durations, both generated for different host 2a and oncoming vehicle 2b velocities, in accordance with the above example.

Figure 5:
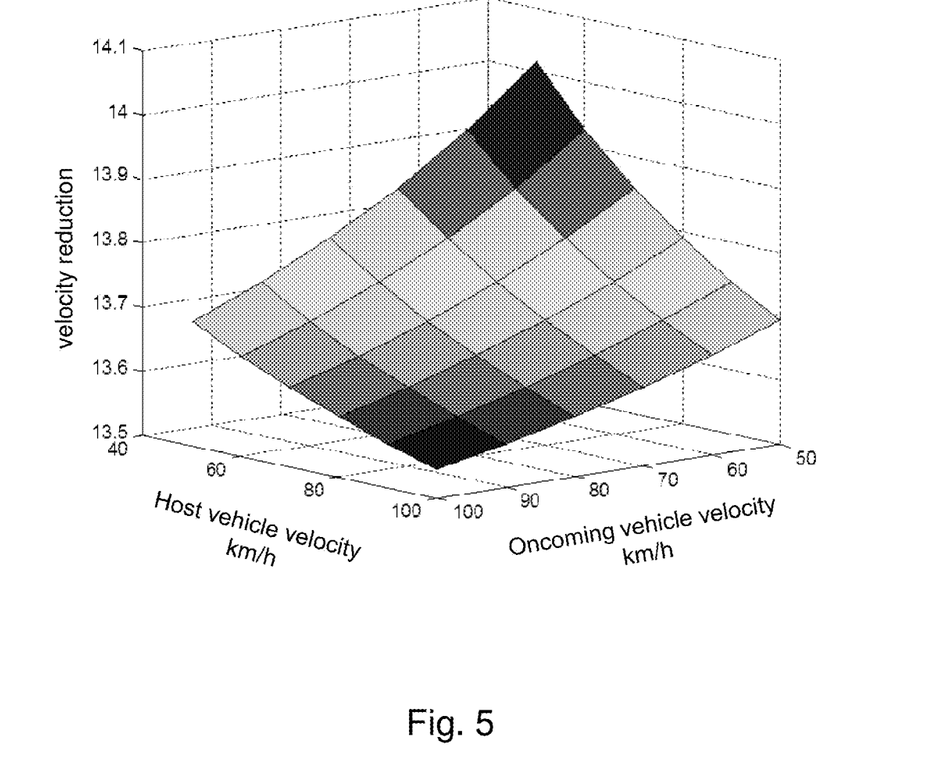
FIG. 5 is a schematic illustration of resulting velocity reductions as a function of different host and vehicle velocities according to an example herein.

The patched surface of FIG. 5 illustrates the resulting velocity reductions as a function of the different host 2a and oncoming vehicle 2b velocities, in accordance with the above example.

Figure 6:
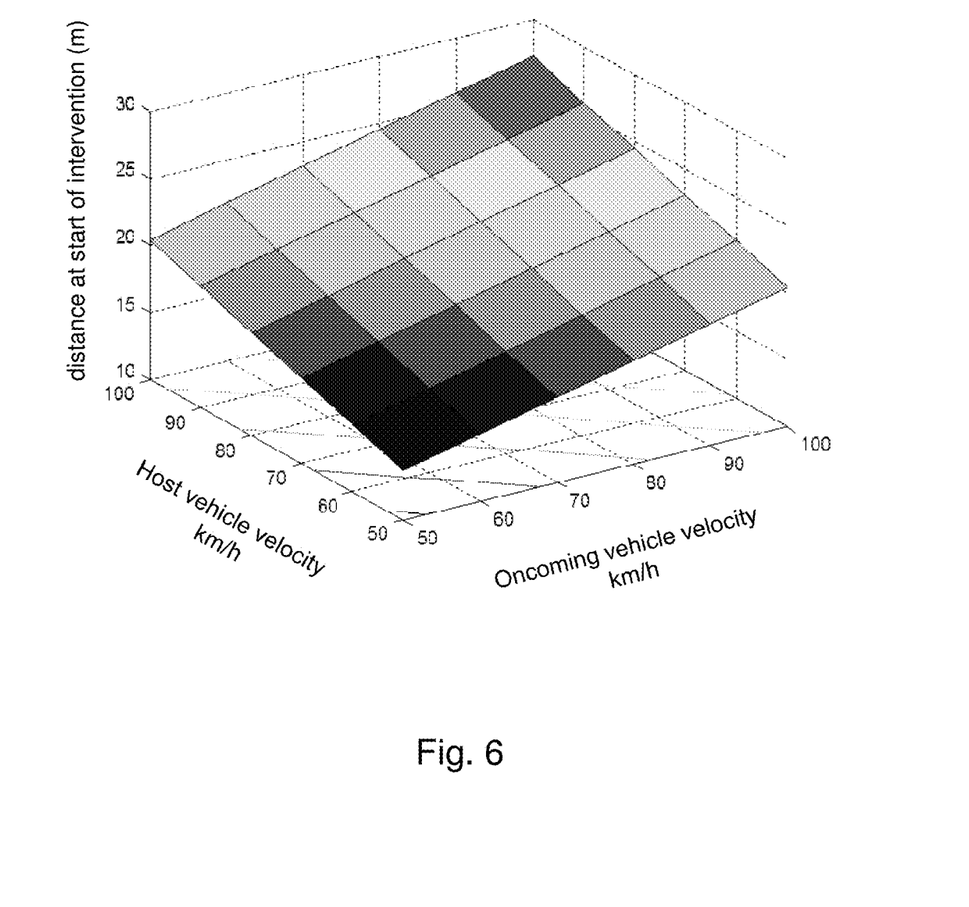
FIG. 6 is a schematic illustration of relative distance at the start of braking intervention as a function of different host and oncoming vehicle velocities according to an example herein.

The patched surface of FIG. 6 illustrates the relative distance at the start of braking intervention as a function of the different host 2a and oncoming vehicle 2b velocities, in accordance with the above example.

Figure 7:
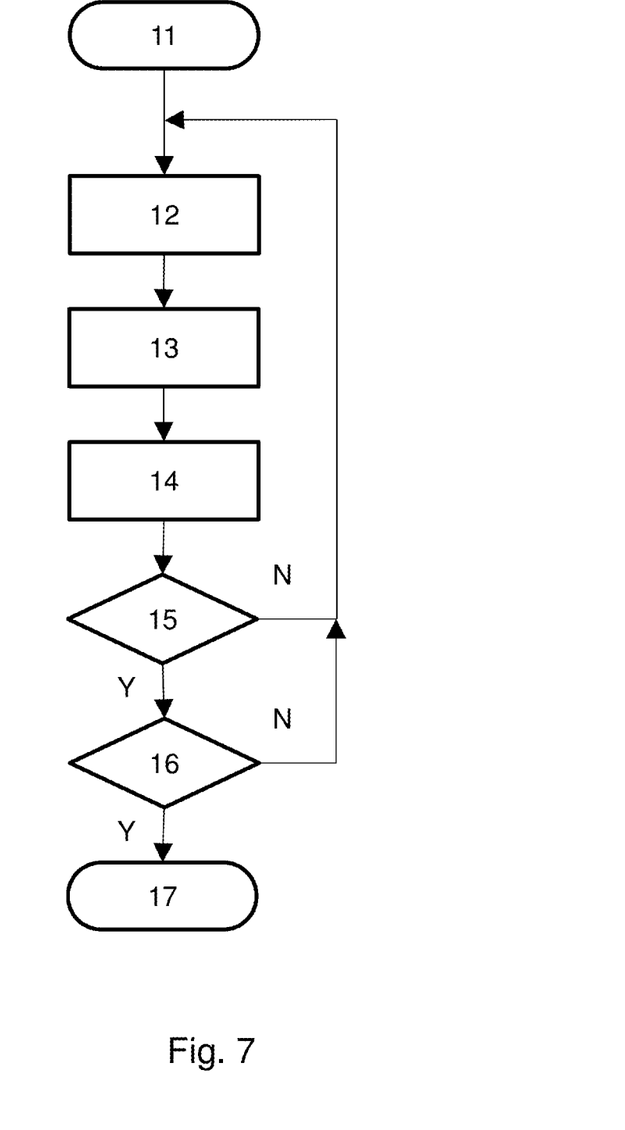
FIG. 7 is a schematic illustration of a method for mitigating a forward collision between a host vehicle and an oncoming vehicle according to embodiments herein.

It is further envisaged herein an improved method for mitigating a forward collision between a host vehicle 2a and an oncoming vehicle 2b, as illustrated schematically in FIG. 7, the host vehicle 2a having one or more sensors 3 arranged to monitor a road ahead of the host vehicle 2a and a braking system 4 connected to wheel brakes 6, 7 thereof This is provided through a method starting at 11 that comprises the steps of:

12—utilizing the one or more sensors to establish the presence of an oncoming vehicle 2b and estimating parameters such as the distance between the oncoming vehicle 2b and the host vehicle 2a, lateral and longitudinal velocity of the oncoming vehicle 2b, relative longitudinal velocity between the host vehicle 2a and the oncoming vehicle 2b and lateral and longitudinal acceleration of the oncoming vehicle 2b;

13—utilizing the estimated parameters to predict a future path of the oncoming vehicle 2b;

14—utilizing host vehicle 2a parameters to predict a future path of the host vehicle;

15—assessing the predicted future paths of the oncoming vehicle 2b and of the host vehicle 2a to determine if a forward collision between the host vehicle 2a and the oncoming vehicle 2b is likely unavoidable assuming full freedom for performing avoidance maneuvers for both the host vehicle 2a and the oncoming vehicle 2b in the prediction of the respective future paths of the host vehicle 2a and the oncoming vehicle 2b.

If a forward collision is determined likely unavoidable the method proceeds to step 16, otherwise it loops back repeating steps 12 through 14.

16—determining if a relative longitudinal velocity is above a first threshold.

If a relative longitudinal velocity is determined above a first threshold the method proceeds to step 17, otherwise it loops back repeating steps 12 through 15.

17—controlling the wheel brakes of the host vehicle 2a to reduce a relative longitudinal velocity between the host vehicle 2a and the oncoming vehicle 2b at a predicted collision instant if determined that a forward collision between the host vehicle 2a and the oncoming vehicle 2b is likely unavoidable at a determined relative longitudinal velocity above a first threshold.

Further, in accordance with the present application is also envisaged a road vehicle 2 that comprises an arrangement for mitigating a forward collision between a host vehicle 2a and an oncoming vehicle 2b, as described in the foregoing.

Such a road vehicle 2 that comprises an arrangement for mitigating a forward collision between a host vehicle 2a and an oncoming vehicle 2b, as above, provides for efficient mitigation through providing a reduction of a relative longitudinal velocity between the host vehicle 2a and the oncoming vehicle 2b at a predicted collision instant, such that passive safety systems of the vehicle may better handle a resulting collision.

It should be noted that the collision mitigating arrangement 1, the vehicle forward collision threat evaluation system 1a, the forward collision mitigation brake controller 1b, the warning arrangement 1c, the supplemental restraint system 10, and any other system, subsystem, device or module described herein may individually, collectively, or in any combination comprise appropriate circuitry, such as one or more appropriately programmed processors (e.g., one or more microprocessors including central processing units (CPU)) and associated memory, which may include stored operating system software and/or application software executable by the processor(s) for controlling operation thereof and for performing the particular algorithms represented by the various functions and/or operations described herein, including interaction between and/or cooperation with each other. One or more of such processors, as well as other circuitry and/or hardware, may be included in a single ASIC (Application-Specific Integrated Circuitry), or several processors and various circuitry and/or hardware may be distributed among several separate components, whether individually packaged or assembled into a SoC (System-on-a-Chip).

The above-described embodiments may be varied within the scope of the following claims.

Thus, while there have been shown and described and pointed out fundamental novel features of the embodiments herein, it will be understood that various omissions and substitutions and changes in the form and details of the devices illustrated, and in their operation, may be made by those skilled in the art. For example, it is expressly intended that all combinations of those elements and/or method steps which perform substantially the same function in substantially the same way to achieve the same results are equivalent. Moreover, it should be recognized that structures and/or elements and/or method steps shown and/or described in connection with any disclosed form or embodiment herein may be incorporated in any other disclosed or described or suggested form or embodiment as a general matter of design choice.

What is claimed is:

1. An arrangement for mitigating a forward collision between a host vehicle and an oncoming vehicle, the host vehicle having one or more sensors arranged to monitor a road ahead of the host vehicle and a braking system connected to wheel brakes thereof, the arrangement comprising:
  a vehicle forward collision threat evaluation system configured to:
    utilize the one or more sensors to establish presence of an oncoming vehicle,
    estimate parameters associated with the oncoming vehicle,
    utilize the estimated parameters to predict a future path of the oncoming vehicle,
    utilize host vehicle parameters to predict a future path of the host vehicle, and
    assess the predicted future paths of the oncoming vehicle and of the host vehicle to determine whether a forward collision between the host vehicle and the oncoming vehicle is likely unavoidable assuming freedom for performing avoidance maneuvers for both the host vehicle and the oncoming vehicle in the prediction of the respective future paths of the host vehicle and the oncoming vehicle using an assessment of scenarios for possibilities of the host vehicle to avoid the forward collision and scenarios for possibilities of the oncoming vehicle to avoid the forward collision, such that the forward collision is determined as likely unavoidable when determined best case scenarios for both the host vehicle and the oncoming vehicle are predicted to end in the forward collision; and a forward collision mitigation brake controller configured to control the braking system to control wheel brakes of the host vehicle to reduce a relative longitudinal velocity between the host vehicle and the oncoming vehicle at a predicted collision instant only when determined that a forward collision between the host vehicle and the oncoming vehicle is likely unavoidable at a determined relative longitudinal velocity between the host vehicle and the oncoming vehicle above a first threshold, the first threshold being selected such that passive safety systems of the host vehicle are configured to handle a forward collision at relative longitudinal velocities below the first threshold.

2. The arrangement according to claim 1 wherein the estimated parameters include one or more of distance between the oncoming vehicle and the host vehicle, lateral and longitudinal velocity of the oncoming vehicle, relative longitudinal velocity between the host vehicle and the oncoming vehicle, and lateral and longitudinal acceleration of the oncoming vehicle.

3. The arrangement according to claim 1 wherein the forward collision mitigation brake controller is configured to control the wheel brakes of the host vehicle to reduce a relative velocity between the host vehicle and the oncoming vehicle through activating at least one of:
brake gain to increase braking when a driver of the road vehicle is already braking; and
auto brake to perform braking when a driver of the road vehicle is not already braking.

4. The arrangement according to claim 1 wherein the vehicle forward collision threat evaluation system is configured to compare the predicted future path of the oncoming vehicle with the predicted future path of the host vehicle to determine whether a forward collision between the host vehicle and the oncoming vehicle is likely unavoidable assuming freedom for performing avoidance maneuvers for both the host vehicle and the oncoming vehicle and using an assessment of scenarios for possibilities of the host vehicle to avoid the forward collision and scenarios for possibilities of the oncoming vehicle to avoid the forward collision, such that the forward collision is determined as likely unavoidable when both the host vehicle and the oncoming vehicle need to perform evasive maneuvers at dynamic capabilities of the respective vehicles to avoid the forward collision.

5. A road vehicle comprising the arrangement for mitigating a forward collision between a host vehicle and an oncoming vehicle according to claim 1.

6. The arrangement according to claim 1 wherein the vehicle forward collision threat evaluation system is arranged to:
predict relative lateral vehicle positions of the host vehicle and the oncoming vehicle at a predicted collision instant;
predict relative lateral motion of the host vehicle and the oncoming vehicle at a predicted collision instant;
assume lateral avoidance maneuvers of the host vehicle and the oncoming vehicle;
assume longitudinal motion of the host vehicle and the oncoming vehicle, and
determine whether a forward collision between the host vehicle and the oncoming vehicle is likely unavoidable through assessing at least one of:
predicted relative lateral vehicle positions of the host vehicle and the oncoming vehicle at a predicted collision instant;
predicted relative lateral motion of the host vehicle and the oncoming vehicle at a predicted collision instant;
assumed lateral avoidance maneuvers of the host vehicle and the oncoming vehicle;
assumed longitudinal motion of the host vehicle and the oncoming vehicle.

7. The arrangement according to claim 6 wherein the vehicle forward collision threat evaluation system is configured to adjust at least one of the predictions and assumptions based on at least one of:
data on a determined state of a driver of the host vehicle;
data on a configuration of host vehicle surrounding infrastructure;
data on a host vehicle traffic situation.

8. The arrangement according to claim 7 further comprising a supplemental restraint system configured to activate at least one of seat belt pre-tensioners, front airbags and inflatable curtains when determined that a forward collision between the host vehicle and the oncoming vehicle is likely unavoidable.

9. The arrangement according to claim 6 further comprising a warning arrangement configured to alert at least one of a driver of the host vehicle and a driver of the oncoming vehicle when determined that a forward collision between the host vehicle and the oncoming vehicle is likely unavoidable.

10. The arrangement according to claim 1 wherein the first threshold is 100 km/h.

11. A method for mitigating a forward collision between a host vehicle and an oncoming vehicle, the host vehicle having one or more sensors arranged to monitor a road ahead of the host vehicle and a braking system connected to wheel brakes thereof, the method comprising:
utilizing the one or more sensors to establish presence of an oncoming vehicle;
estimating parameters associated with the oncoming vehicle;
utilizing the estimated parameters to predict a future path of the oncoming vehicle;
utilizing host vehicle parameters to predict a future path of the host vehicle;
assessing the predicted future paths of the oncoming vehicle and of the host vehicle to determine whether a forward collision between the host vehicle and the oncoming vehicle is likely unavoidable assuming freedom for performing avoidance maneuvers for both the host vehicle and the oncoming vehicle in the prediction of the respective future paths of the host vehicle and the oncoming vehicle using an assessment of scenarios for possibilities of the host vehicle to avoid the forward collision and scenarios for possibilities of the oncoming vehicle to avoid the forward collision, such that the forward collision is determined as likely unavoidable when determined best case scenarios for both the host vehicle and the oncoming vehicle are predicted to end in the forward collision;

determining whether a relative longitudinal velocity is above a first threshold; and controlling the wheel brakes of the host vehicle to reduce a relative longitudinal velocity between the host vehicle and the oncoming vehicle at a predicted collision instant only when determined that a forward collision between the host vehicle and the oncoming vehicle is likely unavoidable at a determined relative longitudinal velocity between the host vehicle and the oncoming vehicle above a first threshold, the first threshold being selected such that passive safety systems of the host vehicle are configured to handle a forward collision at relative longitudinal velocities below the first threshold.

12. The method according to claim 11 wherein the estimated parameters include one or more of distance between the oncoming vehicle and the host vehicle, lateral and longitudinal velocity of the oncoming vehicle, relative longitudinal velocity between the host vehicle and the oncoming vehicle, and lateral and longitudinal acceleration of the oncoming vehicle.

* * * * *